March 30, 1926. 1,578,956
H. S. CLARK
BUMPER SUPPORT FOR VEHICLES
Filed Oct. 31, 1925
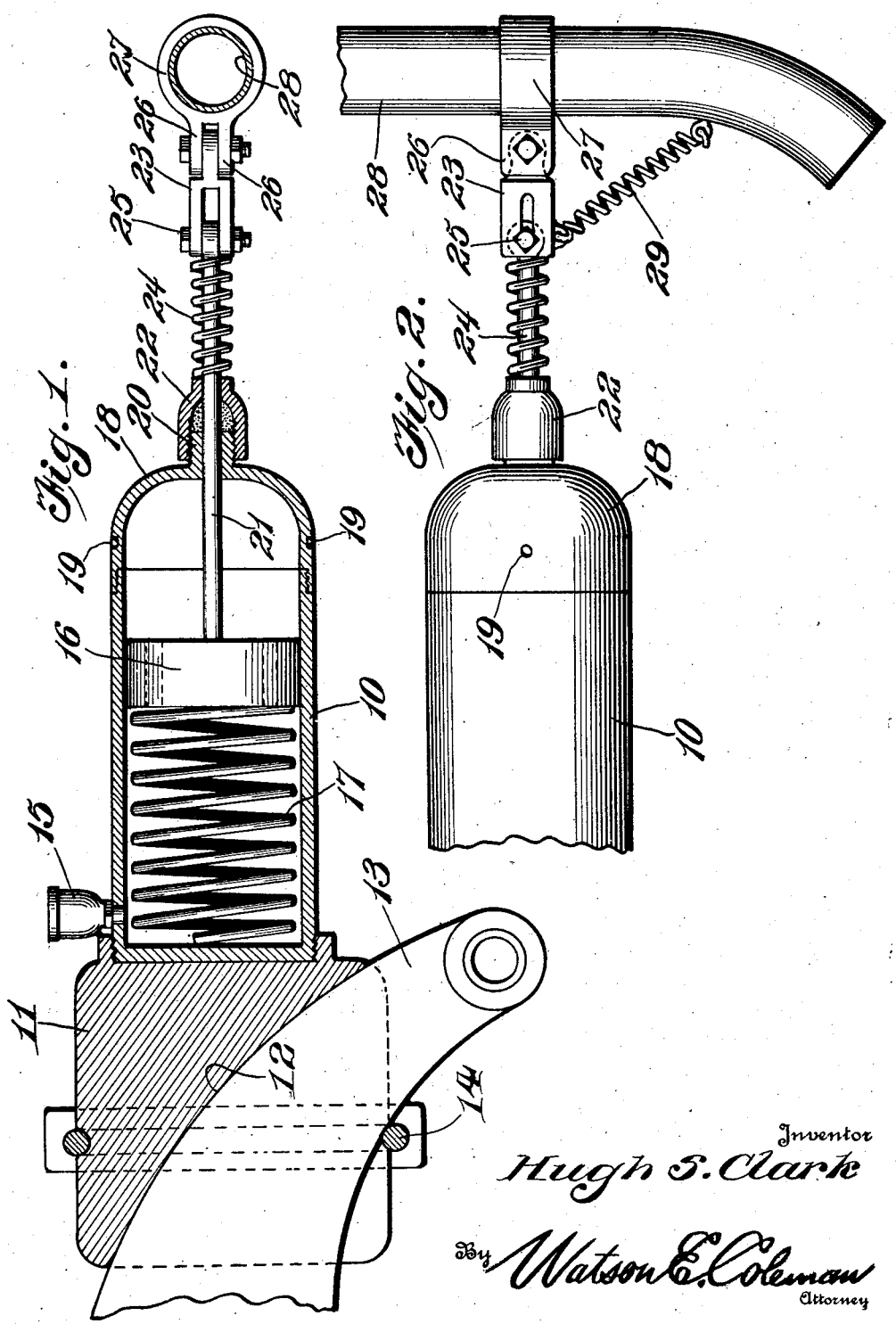
Inventor
Hugh S. Clark
By Watson E. Coleman
Attorney Patented Mar. 30, 1926.

1,578,956

UNITED STATES PATENT OFFICE.

HUGH S. CLARK, OF ELIZABETH, NEW JERSEY.

BUMPER SUPPORT FOR VEHICLES.

Application filed October 31, 1925. Serial No. 66,036.

*To all whom it may concern:*

Be it known that I, HUGH S. CLARK, a citizen of the United States, residing at Elizabeth, in the county of Union and State of New Jersey, have invented certain new and useful Improvements in Bumper Supports for Vehicles, of which the following is a specification, reference being had to the accompanying drawings.

This invention relates to bumper supports for vehicles and more particularly to a combined spring and fluid pressure operated bumper.

An important object of the invention is to provide a construction of this character permitting a limited relative movement of the bumper element and the piston of the fluid operated element for opposing movements of the bumper so that this fluid operated element is not brought into play in response to relatively light shocks.

A further object of the invention is to provide an improved means for mounting the bumper.

A still further object of the invention is to provide a novel and improved construction of the cylinder and its connections with the bumper and vehicle.

These and other objects I attain by the construction shown in the accompanying drawing, wherein for the purpose of illustration is shown a preferred embodiment of my invention and wherein:—

Figure 1 is a longitudinal sectional view through a bumper support constructed in accordance with my invention;

Figure 2 is a plan view thereof.

Referring now more particularly to the drawing, the numeral 10 indicates a cylinder having one end head 11 thereof in the form of a casting provided with a formed recess 12 for receiving the forward end of the frame member 13 of a vehicle and having means, as at 14, whereby it may be secured thereto. Adjacent this end of the cylinder, the wall of the cylinder has means, as at 15, whereby the cylinder may be filled with a suitable fluid, such as oil or alcohol. The cylinder is provided with the usual loosely fitting piston 16 projected outwardly by means of a spring 17.

The outer end head 18 is in the form of a screw-threaded cap engaging the outer end of the cylinder and having openings, as at 19, for the reception of a spanner wrench. The outer end of this cap is formed as a packing gland 20 for the rod 21 of the piston. This gland has a removable nut 22 and between this nut and a bracket 23 receiving the outer end of the piston rod, a spring 24 surrounds the piston rod. The bracket 23 has a pin and slot connection, as at 25, with the piston rod 21 permitting limited relative longitudinal movement thereof against the action of the spring 24 and this bracket is formed at its outer end to engage between spaced arms 26 of a yoke 27 embracing the bumper bar 28. The connection between the arms 26 and the bracket provides a pivotal connection so that the bracket is actually pivoted to both the rod and yoke. Between the outer ends of the bumper bar 28 and the outer ends of the adjacent piston rods, tension springs 29 extend combining to maintain these brackets in proper alignment.

It will be obvious that in the operation of the device, in response to light shocks, the bar may yield against the action of the spring 24 without effecting any operation of the piston 16. If, however, the shock is considerable, the bar will come into fixed engagement with the piston rod so that the piston is shifted against the action of the fluid contained in the cylinder. It will be noted that the pin during such operations does not come into engagement with the wall of its slot so that strain is placed upon the bracket 23 and not upon this pin, thus preventing destruction thereof. It will also be noted that the connections between the rods and bumper bars will permit yielding of one end of the bumper bar independently of the opposite end and will permit effective longitudinal shifting of the bumper bar at its point of connection with the rod so that transverse strain will not be placed upon the rod. The minute the strain is released from the bumper 28, however, the springs 29 will restore the connections to their proper position.

Since the construction hereinbefore set forth is obviously capable of a certain range of change and modification without materially departing from the spirit of the invention, I do not limit myself to such specific structure except as hereinafter claimed.

I claim:—

1. In a bumper mounting of the type described, a cylinder having one end head formed as a casting recessed to receive the front end of the frame member of a vehicle, a piston within the cylinder, a spring urging the piston outwardly, the piston having a rod projecting through the opposite end head of the cylinder, a bumper bracket carried by and capable of limited longitudinal movement with relation to the rod and a spring surrounding the rod between the last named head and the bracket resisting said longitudinal movement of the bracket.

2. In a bumper mounting of the type described, a cylinder having one end head formed as a casting recessed to receive the front end of the frame member of a vehicle, a piston within the cylinder, a spring urging the piston outwardly, the piston having a rod projecting through the opposite end head of the cylinder, a bumper bracket carried by and capable of limited longitudinal movement with relation to the rod and a spring surrounding the rod between the last named head and the bracket resisting said longitudinal movement of the bracket, the connections of the bumper bar to the rod permitting limited longitudinal movement of the bumper bar.

3. In a bumper mounting of the type described, a cylinder having one end head formed as a casting recessed to receive the front end of the frame member of a vehicle, a piston within the cylinder, a spring urging the piston outwardly, the piston having a rod projecting through the opposite end head of the cylinder, a bumper bracket carried by and capable of limited longitudinal movement with relation to the rod, a spring surrounding the rod between the last named head and the bracket resisting said longitudinal movement of the bracket, the connections of the bumper bar to the rod permitting limited longitudinal movement of the bumper bar and a spring connecting the end of the bumper with the adjacent end of the rod.

4. In a bumper mounting of the type described, a cylinder having one end head formed as a casting recessed to receive the front end of the frame member of a vehicle, a piston within the cylinder, a spring urging the piston outwardly, the piston having a rod projecting through the opposite end head of the cylinder, a bracket having pin and slot engagement with the rod, a spring surrounding the rod between the last named head and the bracket and a bumper yoke pivoted to a vertical pivot carried by the outer end of the bracket.

5. In a bumper mounting of the type described, a cylinder having one end head formed as a casting recessed to receive the front end of the frame member of a vehicle, a piston within the cylinder, a spring urging the piston outwardly, the piston having a rod projecting through the opposite end head of the cylinder, a bracket having pin and slot engagement with the rod, a spring surrounding the rod between the last named head and the bracket and a bumper yoke pivoted to a vertical pivot carried by the outer end of the bracket, the bracket having engagement with the rod preventing engagement of the pin in the end of its slot under pressure exerted against the bracket.

6. In a bumper mounting, a rod directed through a bearing for longitudinal movement, means yieldably urging the rod in one direction, a bumper bracket carried by and capable of limited longitudinal movement with relation to the rod and means yieldably resisting the longitudinal movement of the bracket.

7. In a bumper mounting of the type described, a bearing, a rod directed through the bearing for longitudinal movement, a spring urging the rod in one direction, a bracket having a pin and slot engagement with the rod, a spring surrounding the rod between the bearing and the bracket and a bumper yoke pivoted to a vertical pivot carried by the outer end of the bracket.

In testimony whereof I hereunto affix my signature.

HUGH S. CLARK.